May 27, 1941.  O. E. ESVAL ET AL  2,243,458
APPARATUS FOR BALANCING ROTORS
Original Filed June 12, 1937  4 Sheets-Sheet 2
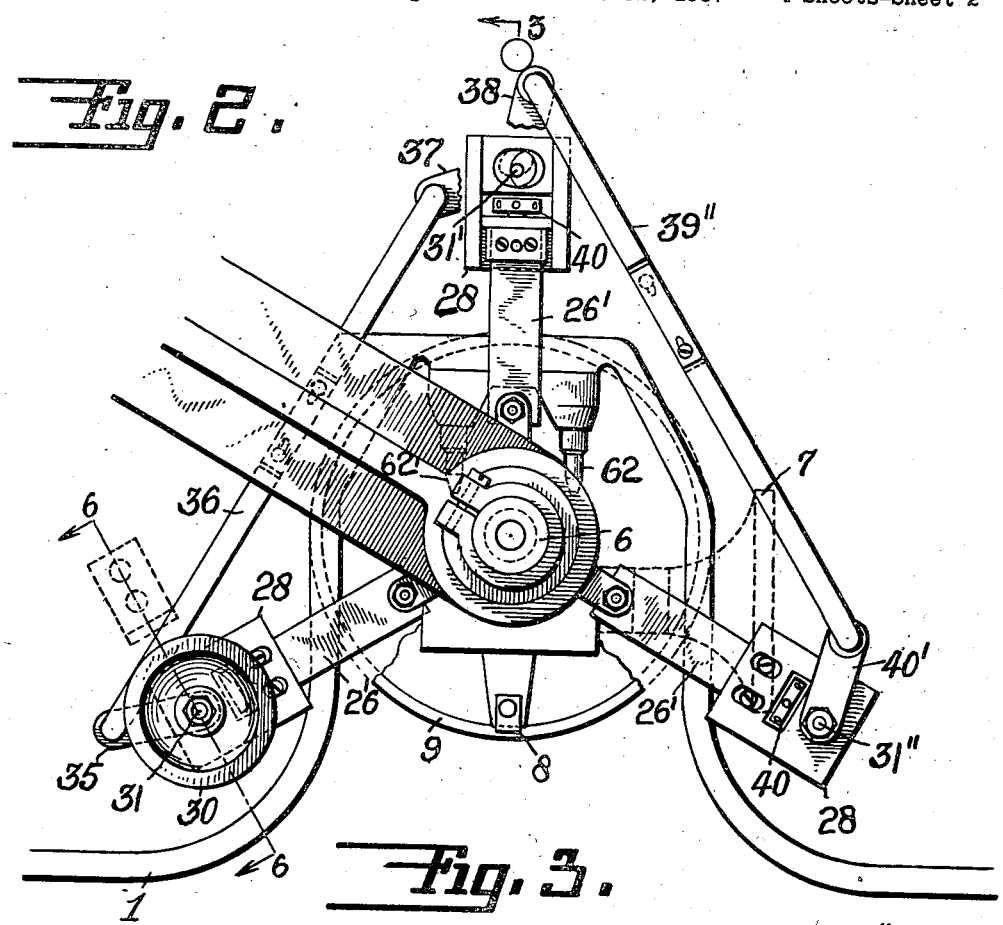
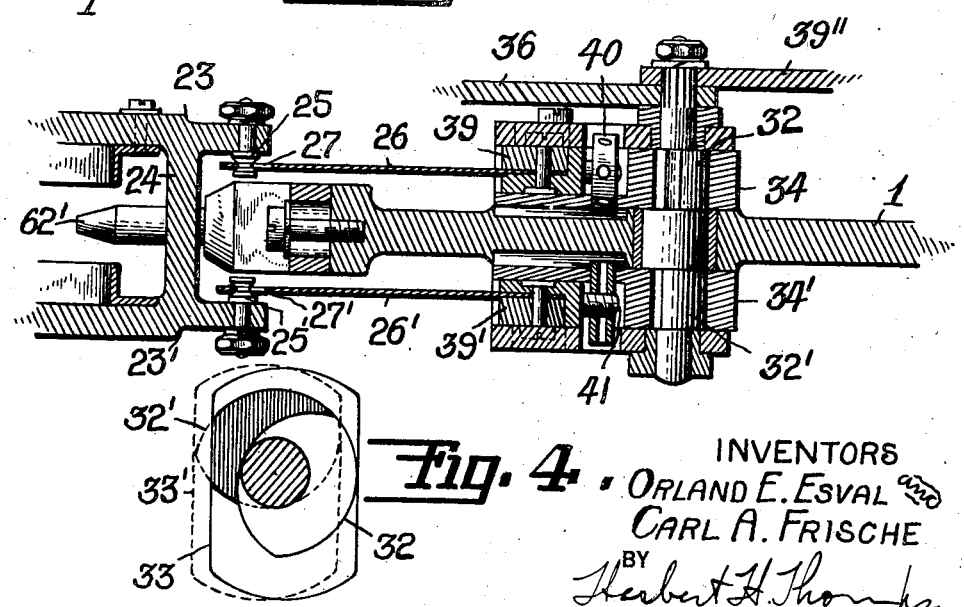
INVENTORS
ORLAND E. ESVAL and
CARL A. FRISCHE
BY Herbert H. Thompson
THEIR ATTORNEY

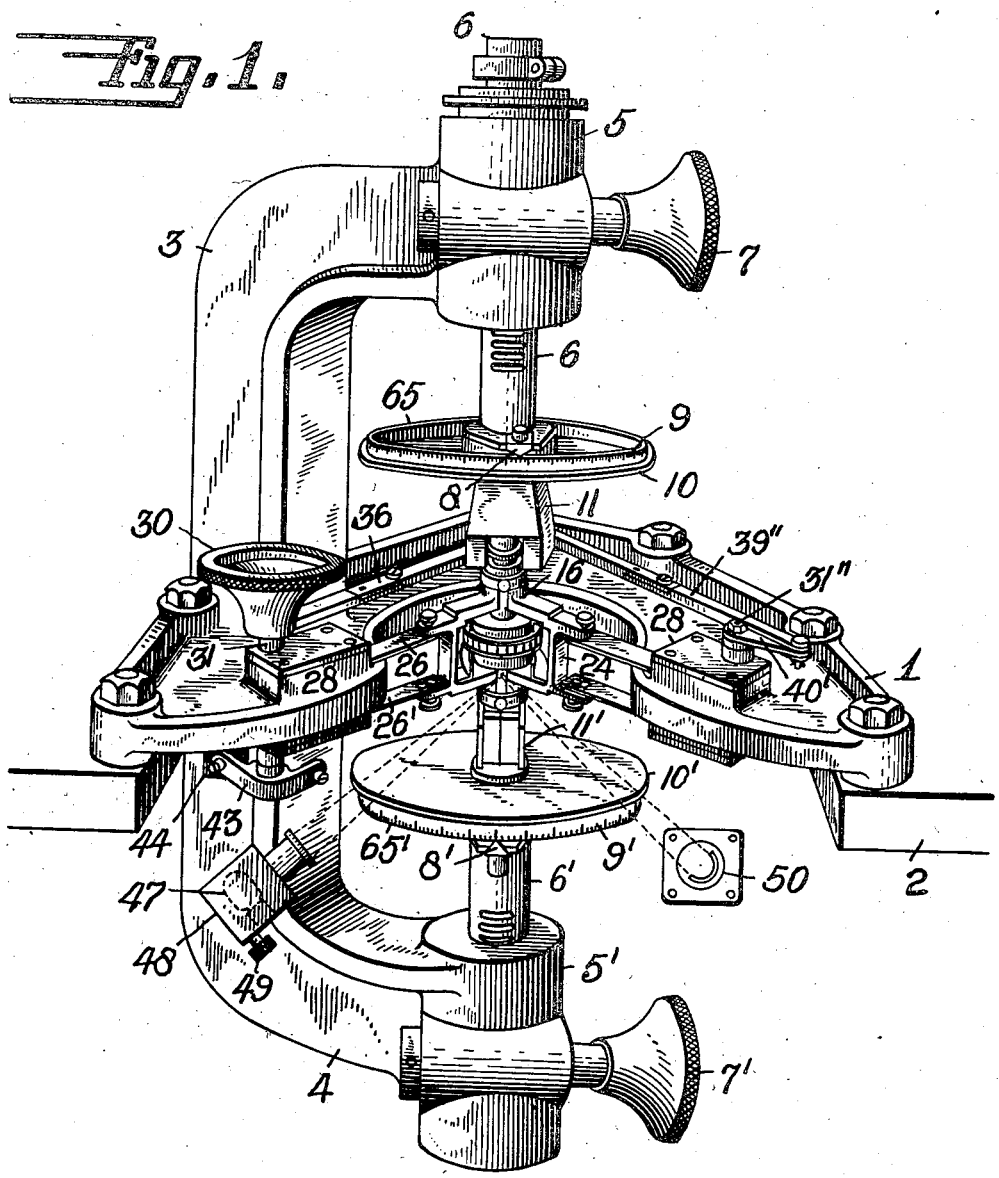

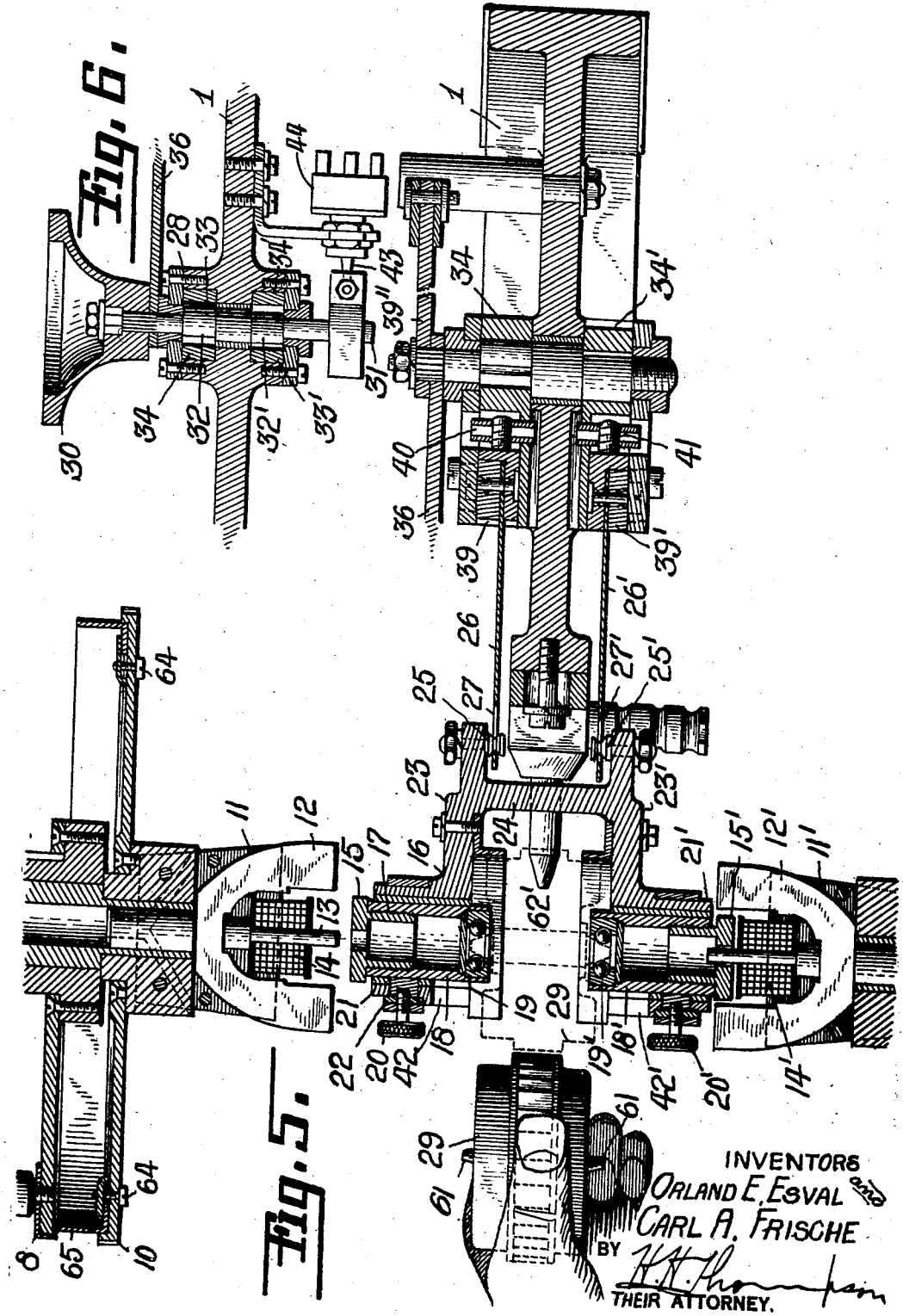

May 27, 1941.   O. E. ESVAL ET AL   2,243,458
APPARATUS FOR BALANCING ROTORS
Original Filed June 12, 1937    4 Sheets-Sheet 4
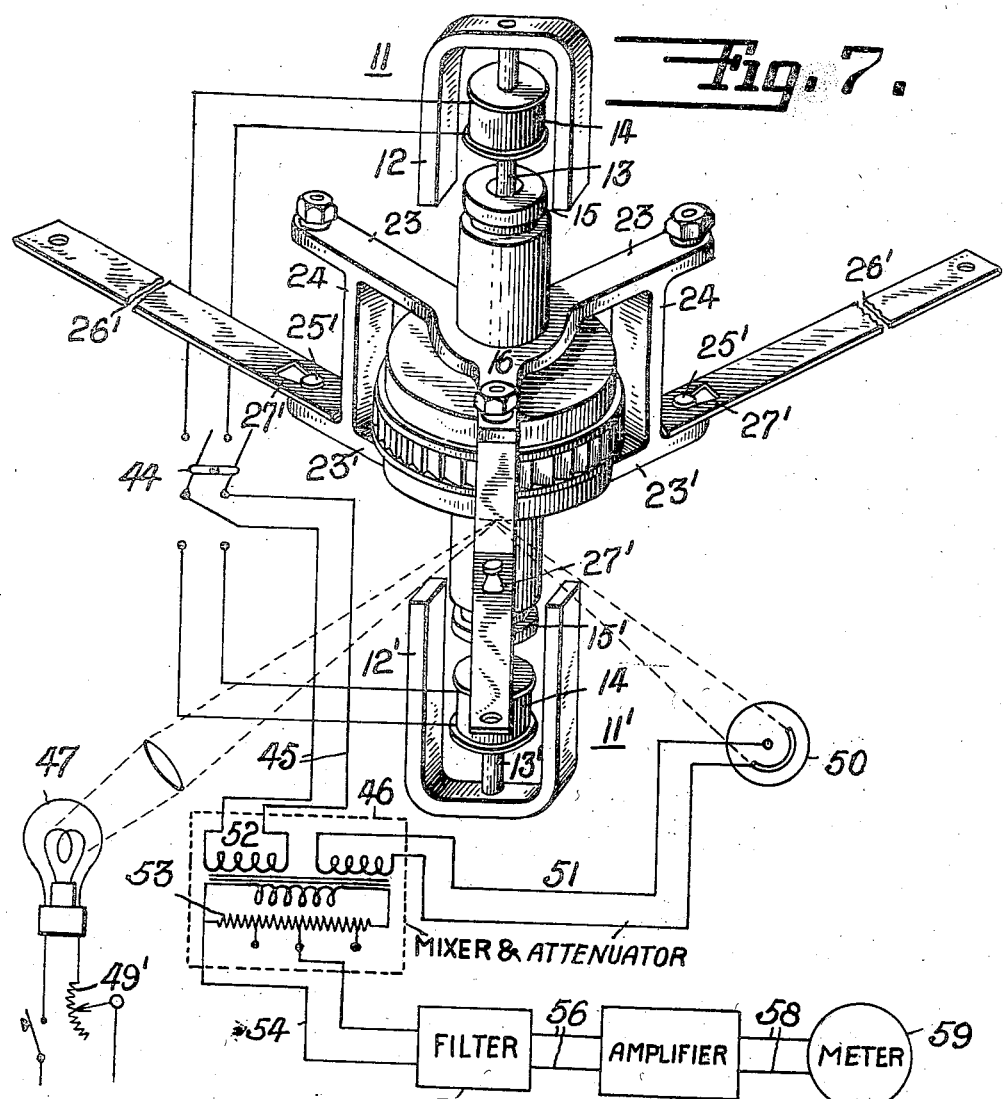
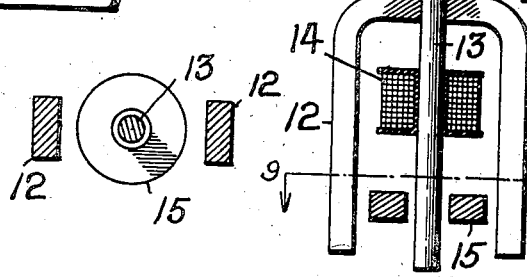
INVENTORS
ORLAND E. ESVAL
CARL A. FRISCHE
BY
THEIR ATTORNEY Patented May 27, 1941

2,243,458

UNITED STATES PATENT OFFICE 2,243,458

APPARATUS FOR BALANCING ROTORS

Orland E. Esval, Allendale, and Carl A. Frische, Leonia, N. J., assignors to Sperry Gyroscope Company, Inc., Brooklyn, N. Y., a corporation of New York Application June 12, 1937, Serial No. 147,816
Renewed January 17, 1940

19 Claims. (Cl. 73—53)

This invention relates, generally, to the balancing of rotors and the invention has reference, more particularly, to a novel apparatus especially adapted for the speedy dynamic balancing of gyroscope rotors, flywheels, etc., in production work.

In our copending application Serial No. 91,444, filed July 18, 1936, there is disclosed a novel balancing apparatus adapted to receive the rotor in a balancing frame that is arranged to pivot in a single correction plane extending at an end of the rotor perpendicular to the rotor axis so that the vibration movement in that plane causes no vibration in the system, whereby readings of the amount of vibration taken at the other end of the rotor give true indications of the unbalanced moment in such other end. Such an apparatus has been found essential in the balancing of high speed rotors, i. e., rotors operating at speeds from 5000 to 40,000 R. P. M. and over, inasmuch as the hand "trial and error" methods heretofore used in balancing have been found entirely unsatisfactory for rotors operating at high speeds, the experienced operators employed in this work being unable to "feel" unbalance in such high speed rotors.

The principal object of the present invention is to provide a novel apparatus especially suitable for production balancing, the said apparatus comprising certain improvements and refinements over the apparatus of our copending application, whereby more rapid balancing is obtained.

Another object of the present invention lies in the provision of novel apparatus of the above character that is so constructed and arranged as to substantially eliminate danger of injury to the rotor trunnions while inserting rotors into and removing them from the apparatus, the said apparatus utilizing duplicate electromagnetic pick-up units together with two sets of rotor frame supporting spring means, one pick-up unit and one spring means being located at each correction plane, together with manually operable cam means for changing the pivotal rotor frame support from one correction plane to the other at will, the shifting of the support also serving to automatically connect the proper pick-up unit to the indicating circuit, whereby unbalance at both ends of the rotor may be determined upon a single insertion of the rotor into the apparatus.

A further object of this invention lies in the provision of a novel balancing apparatus of the above character that is so constructed that unskilled operators can manipulate the same to rapidly detect and determine rotor unbalance with a minimum hazard to the finished rotor.

Still another object of the present invention is to employ electromagnetic pick-up units providing very loose coupling between the rotor frame and the pick-up units proper, there being no mechanical coupling between these parts, whereby the critical speed is greatly lowered, i. e., the speed where the vibratory displacement of the rotor frame becomes very large and the angle between the displacement vector and the unbalanced weight changes rapidly with speed, thereby allowing operation of the rotor being balanced at lower speeds than possible in the apparatus of our copending application.

Other objects and advantages will become apparent from the specification, taken in connection with the accompanying drawings wherein one embodiment of the invention is illustrated.

In the drawings:

Fig. 1 is a perspective view of the novel apparatus of the present invention, showing a rotor mounted therein for balancing.

Fig. 2 is a partial plan view of the structure of Fig. 1.

Fig. 3 is a fragmentary sectional view taken along line 3 of Fig. 2, the springs in the correction planes being both locked preparatory to receiving a rotor in the apparatus for balancing.

Fig. 4 is a schematic plan view of the cam arrangement used for shifting the rotor frame supporting springs.

Fig. 5 is a vertical sectional view of a portion of the apparatus of Fig. 1 and shows the apparatus positioned for pivoting the rotor in the upper correction plane, as when determining the unbalanced moment in the lower correction plane.

Fig. 6 is a sectional view taken along line 6—6 of Fig. 2.

Fig. 7 is a schematic diagram of the apparatus and connected circuits.

Fig. 8 is a schematic view, in elevation, of the pick-up unit, and

Fig. 9 is a sectional view taken along line 9—9 of Fig. 8.

Similar characters of reference are used in all of the above figures to indicate corresponding parts.

The underlying theory of automatic balancing embodied in the apparatus of this invention is based on the fact that assuming a fixed rotor speed, the rotating deflection of the rotor shaft, rotor casing, etc., has a fixed phase relation to the disturbing force or weight, the deflection being apparent as vibration. The motion resulting at each end of the rotor from dynamic unbalance of the rotor is approximately circular in a plane perpendicular to the rotor shaft. Thus, a particle at the end of the rotor axis moves in a circular path and this motion has a definite phase or angular relation to the unbalanced weight of the rotor, so that should the dynamic unbalance at one end of the rotor be advanced by a certain angle, the particle on the gyro axis will be correspondingly advanced by the same angle in its circular path. Two indications are necessary in dynamically balancing an end of a rotor, one indication being the magnitude and the other the position of the unbalanced weight. The circular motion of the particle on the rotor axis provides the information which may be used to give both the position and magnitude of the unbalanced weight. At a given speed, the magnitude of the unbalance is directly proportional to the amplitude, i. e., diameter of the circular path in which the particle is moving.

In accordance with the present invention, a novel ring type of electromagnetic pick-up unit or vibration instrument is employed, which has a very loose coupling with the rotor frame at the axis of the rotor, two of these pick-up units being employed, one at each end of the rotor, to generate voltages proportional to the amplitude at a desired frequency. With the rotor pivoted at one correction plane extending at right angles to the rotor axis at one end of the rotor, the voltage generated in the pick-up unit at the other end of the rotor is proportional to the moment of the unbalanced rotor weight in the other correction plane, so that a voltmeter connected to the output of the pick-up unit will therefore indicate directly the degree of dynamic unbalance at such other end of the rotor or correction plane. The electromagnetic pick-up unit is designed so as to be sensitive to vibration in only one plane, and hence it generates voltage as though the motion of the particle were vibrating across the diameter of its circular path. By having the unit turnable, the same can be positioned to generate voltage along any diameter of this path and the value of the voltage output of all positions is the same. The phase relation between the voltages is, however, effected directly by the angular position of the pick-up unit, so that as this unit is turned angularly, the phase of the output voltage of the pick-up is correspondingly varied. This property of change in phase with change in angular position of the pick-up is used to provide the necessary information for determining the position of the unbalanced weight.

To obtain a reference frequency voltage while at the same time avoiding any generator mechanically attached to the rotor, we employ a photocell receiving light reflected from the rotor being balanced, said rotor having a part, such as a half, of the surface thereof highly polished and the remainder not polished, a suitable light source being employed for directing light upon the rotor surface for reflection to the photocell. Thus, the output of the photocell is caused to change cyclically at rotor frequency, which is also the output frequency of the electromagnetic pick-up unit.

In performing the balancing operation, the output voltage of the pick-up unit is phased against the output voltage of the photocell as by use of a suitable meter or cathode ray oscillograph. The phase of the pick-up unit output is adjusted by changing the angular position thereof, whereby the same is caused to buck or boost the photocell output so that the meter or oscillograph will show when the phase angle between the two outputs is either zero or 180°. The angular position of the pick-up unit to give this phase relation serves to determine the angular position of the unbalanced weight with respect to the non-reflecting or unpolished portion of the rotor, whereas the magnitude of the pick-up output is a measure of the magnitude of the unbalanced weight, so that with both factors known, i. e., position and magnitude of the unbalanced weight, the rotor can be readily balanced by removing the indicated amount of material from the correct point on the rotor.

In the drawings, the apparatus is shown as comprising a bedplate 1 mounted upon a suitable table or other support 2, which bedplate has upwardly and downwardly extending arms 3, 4 provided with vertical slide bearings 5, 5' for receiving vertical shafts 6, 6' provided with teeth and adapted to be raised and lowered to any position desired within limits by means of knobs 7, 7' having pinions meshing with the teeth of shafts 6, 6'. These shafts carry angularly stationary pointers 8, 8' cooperating with degree scales 9, 9' provided on annular flanges attached to indicator discs 10, 10' turnably mounted on the shafts 6, 6'. Indicator discs 10, 10' are connected to turn with electromagnetic pick-up units 11, 11', respectively.

Since these pick-up units are identical, only one of them, for example, the upper one, will be described in detail, reference being had in this connection to Figs. 5, 7, 8 and 9. This instrument comprises one or more permanent horseshoe magnets 12 provided with a central cylindrical depending pole 13 of soft iron on which is wound a coil 14. The horseshoe magnet 12 is adapted to cooperate with an armature 15 having the form of a soft iron ring that is arranged to be fixed upon the rotor frame 16. This armature 15 oscillates with the rotor axis under influence of rotor unbalance, so that with the central pole 13 inserted through the apertured center of ring 15, as shown in the lower portion of Fig. 5, the ring or armature 15 is caused to move in an eccentric path around the pole 13 without actually contacting the latter, thereby varying the flux through the central pole 13 periodically and generating a voltage in the coil 14 having a frequency corresponding to that of rotor speed.

Mechanically, the armature 15 is provided with a hollow cylindrical portion 17 that is threaded into a vertically adjustable rotor bearing housing 18 that carries a ball bearing 19 for receiving and supporting a rotor trunnion. The housing 18 is slidably mounted in a hollow hub portion 21 of the rotor frame 16. A thumb screw 20 is threaded into the hub portion 21 of the rotor frame 16 for urging a block 22 against the bearing housing 18 to thereby lock this housing in desired vertically adjusted position within hub 21. The lower pick-up unit 11' similarly has its armature 15' carried by a rotor bearing housing 18', having a ball bearing 19' and being vertically adjustable in the hollow hub portion 21' of the rotor frame 16 by use of the thumb screw 20'.

The rotor frame 16 is of symmetrical spider shape, having three arms radiating from the hubs 21 and 21', each of the said arms having upper and lower horizontal members 23 and 23' and a vertical connecting member 24 positioned inwardly of the outer ends of the members 23, 23'. Spool-like studs 25 and 25' are fixed upon the outer end portions of horizontal members 23 and 23' for engaging in substantially triangular apertures 27, 27' provided in horizontal upper and lower supporting leaf springs 26 and 26'. Leaf springs 26, 26' radiate outwardly from the studs 25, the several pairs of springs 26, 26' being spaced approximately 120° apart to provide a three point support for the rotor frame 16 as will further appear. With a rotor 29 to be tested mounted in the apparatus so that its trunnions are supported by ball bearings 19, 19', the springs 26, 26' are respectively substantially on a level with the ends of the rotor 29, whereby these springs lie in the upper and lower correction planes of this rotor.

The rotor frame 16 is adapted to be selectively supported at either correction plane at will through the action of the springs 26, 26' as controlled from a knob 30. This knob (see Fig. 6) is positioned adjacent the outer ends of one pair of springs 26, 26' and is fixed on the upper end of a vertical cam shaft 31 turnably supported in a casing 28 provided on bedplate 1 and having cams 32 and 32' provided thereon operating in slots 33, 33' provided in radially reciprocable follower blocks 34, 34' movable in guides in casing 28. Knob 30 is connected through a lever arm 35, link 36 and a lever arm 37 to also turn a cam shaft 31' similar to cam shaft 31. Likewise cam shaft 31' is connected through lever arm 38, link 39" and lever arm 40' to turn a cam shaft 31'" also similar to cam shaft 31. Thus, as knob 30 is turned to turn cam shaft 31, the similar cam shafts 31' and 31" are likewise turned.

The radially reciprocable follower blocks 34, 34' actuated from cams 32, 32' on cam shafts 31, 31' and 31" carry spring shackle blocks 39, 39' to which are rigidly secured the outer end portions of leaf springs 26, 26', respectively, for supporting these springs so as to extend horizontally. Spring shackle blocks 39, 39' are shown as being independently adjustable with respect to their follower blocks 34, 34' by turning nuts 40 provided on studs 41 projecting from blocks 39, 39', which nuts engage in slots provided in follower blocks 34, 34'.

Thus, by turning knob 30, the cams 32, 32' are actuated to effect a limited radial movement of springs 26 and 26', the cams being so set angularly that the three upper springs 26 move together either radially outwardly or inwardly and the same is true of the lower set of three springs 26'. When the lower set of springs 26' are moved radially outwardly, for example, the apexes of slots 27' move to firmly engage the reduced central portions of the studs 25', as shown in Fig. 7, to thereby firmly support the frame 16 at its lower portion corresponding to the lower correction plane of the rotor. The cams 32, 32' are so shaped and relatively positioned (see especially Fig. 4) that with knob 30 turned to one limit of its travel, the lower set of springs 26' are positioned at the outer limit of their radial movement to support the rotor frame 16, the upper set of springs 26 being then positioned at the inner limits of their radial movement and out of engagement with studs 25, thereby allowing free vibration of the upper rotor bearing housing 18 and armature 15. Likewise, with knob 30 turned to the other limit of its travel, the springs 26 are at the outer limit of their movement for engaging studs 25 to support the rotor frame 16 while the springs 26' are at the inner limit of their movement and out of engagement with studs 25', as shown in Fig. 5. In an intermediate position of knob 30, springs 26 and 26' both engage their respective studs 25 and 25', as shown in Fig. 3, thereby firmly supporting the rotor frame 16 at both ends and facilitating the insertion of a rotor into this frame and its removal therefrom. Since the rotor frame is supported at all times either by the upper or lower springs 26 and 26', or by both, the frame is always properly centered with respect to the pick-up units 11, 11' and cannot become accidentally displaced. The upper and lower hub portions 21 and 21' are cut away at 42, 42' to enable free passage of the rotor trunnions into and out of the rotor frame 16.

The lower portion of cam shaft 31 carries a switch lever 43 for operating a double pole, double throw switch 44 (see also Fig. 7) that serves to selectively connect electromagnetic pick-up units 11, 11' to leads 45 of an indicating circuit, which leads extend to the mixer and attenuator 46. Thus, when the upper springs 26 are alone supporting the rotor frame 16, the lower pick-up 11' is electrically connected by switch 44 to leads 45, and when lower springs 26' alone support the rotor frame 16, the upper pick-up 11 is electrically connected by switch 44 to leads 45.

To obtain the desired reference voltage, a lamp 47 contained within a housing 48 is employed in conjunction with a photocell 50. The light from lamp 47 is directed, by use of a suitable lens system, upon the underside of the rotor 29 mounted in frame 16, the reflected light from rotor 29 being received by photocell 50. The intensity of the light 47 may be varied at will as by turning the knob 49 in Fig. 1, thereby adjusting the resistance 49' (see Figs. 1 and 7) in the supply of lamp 47. The under surface of the rotor 29 is preferably partially polished so as to form a good reflecting surface, while the remainder of this under surface has little or no reflecting ability. Thus, for example, half of the under surface of rotor 29 may be polished and the other half provided with a dull surface, as by sand blasting. As the rotor 29 turns, the output of photocell 50 is caused to change cyclically at rotor frequency, which is also the output frequency of the pick-up units 11 and 11'.

The output of photocell 50 is connected by leads 51 to the mixer and attenuator 46 of the indicating circuit. This equipment comprises a transformer 52 having two primary windings connected, respectively, to leads 45 and 51 and a single secondary winding connected across a potentiometer 53. Leads 54 connect the potentiometer 53 to a band pass filter 55, the output of which may be connected by leads 56 to a suitable linear thermionic amplifier 57. The output of amplifier 57 is applied by leads 58 to an indicator, such as a voltmeter 59, or a cathode ray oscillograph may be used in lieu of meter 59.

In use, to insert a rotor into the apparatus for balancing, the knob 30 is preferably turned to its intermediate position so that springs 26, 26' both engage their cooperating studs 25, 25', thereby firmly supporting both ends of rotor frame 16. The rotor bearing housings 18, 18' are then moved apart, if necessary, by loosening screws 20, 20' so as to accommodate the rotor 29 therebetween, the rotor then being inserted from the front, as shown in Fig. 5, the rotor body passing between members 23, 23' and the rotor trunnions 61 entering through cut away portions 42. The housings 18, 18' are then moved toward each other so that trunnions 61 are seated in bearings 19, 19', whereupon thumb screws 20, 20' are again tightened, the rotor being now free to turn within frame 16. Air nozzles 62, 62' are shown in Figs. 2, 3 and 5 for controlling the speed of rotor 29, nozzle 62 serving to drive the rotor while 62' acts as a brake, suitable valve means (not shown) being employed for controlling the supply of air from these nozzles.

All rotors of the same size are provided with non-reflecting or dull portions of identical angular extent, the remainder of the rotor surface contacted by the light beam being uniformly polished. The pick-up scales 9, 9' are initially so set angularly with respect to the rotor reflecting surface that when the unbalanced weights at the ends of the rotor coincide with a definite angular point of the rotor non-reflecting portion or black spot, such as an end or the center thereof, the zero reading of scales 9, 9' will coincide with pointers 8, 8'.

Thus, to obtain this initial setting, weights are placed upon the ends of rotor 29 in a common vertical plane extending through an end of the spot on the lower rotor surface. To set the scale 9 properly, the knob 30 is first turned so as to pivot the frame 16 in the lower correction plane, i. e., with springs 26' supporting the rotor. With the rotor up to speed, the knob 7 is operated to move pick-up 11 down so that its pole 13 enters the central opening of armature 15, but without coil 14 touching the armature. With lamp 47 turned off, the meter 59 is now read so as to indicate the pick-up voltage only. The knob 7 is now turned to raise the pick-up 11 out of cooperation with its armature 15, and the lamp 47 is turned on and knob 49 adjusted so that meter 59 reads as before, showing that the outputs of the pick-up 11 and photocell 50 as supplied through the mixer and attenuator 52 are equal. The pick-up 11 is now again lowered into cooperation with its armature 15 and with lamp 47 turned on, the pick-up 11 is angularly adjusted until the meter 59 reads zero, indicating that the equal outputs of the pick-up and photocell are directly out of phase.

The annular flange 65 of the indicator disc 10 is now adjusted angularly so that the zero of scale 9 coincides with the pointer 8. This is accomplished by loosening screws 64 (see Fig. 5) and bodily turning flange 65 until the zero of scale 9 thereon coincides with pointer 8. The scale 9' is now similarly set by pivoting the frame 16 in the upper correction plane, equalizing the output of photocell 50 with that of lower pick-up 11', adjusting pick-up 11' till meter 59 reads zero, and then adjusting scale 9' to zero.

The apparatus is now set for balancing rotors. To determine the unbalance of the rotor in its upper correction plane, the rotor to be balanced is placed in the frame 16, the latter then pivoted in the lower correction plane by turning knob 30 so that springs 26' support this frame 16, the output of pick-up 11 is read on meter 59 with lamp 47 out, whereupon the pick-up 11 is now raised and the lamp 47 lighted and its brightness varied by turning knob 49 until the output of meter 59 is the same as that previously produced by the pick-up 11. This reading of meter 59 corresponds to the magnitude of the unbalanced weight. The pick-up 11 is now lowered and turned until the meter reads zero. The indication of scale 9 now gives the angular position of the unbalanced weight at the upper end of the rotor with respect to the end of the non-reflecting portion of the rotor surface.

To determine the unbalance of the rotor in its lower correction plane, the knob 30 is now turned so that upper springs 26 support the rotor frame, i. e., so that the latter is pivoted in the upper correction plane. The pick-up 11' is elevated to cooperate with its armature 15' and the output of this pick-up is read on meter 59 with lamp 47 out. The indication of the meter corresponds to the magnitude of the unbalanced weight. Pick-up 11' is now lowered and lamp 47 lighted and its brightness varied by use of knob 49 until the output of meter 59 is the same as when receiving the pick-up signal. The pick-up 11' is now again raised and turned until the meter reads zero, whereupon the reading of scale 9' gives the angular position of the unbalanced weight at the lower end of the rotor with respect to the end of the non-reflecting portion of the rotor surface.

The indicated amounts of material are now removed from the rotor ends as by drilling holes of proper depth at the proper respective positions. A calibration curve of drill depth against voltage readings of meter 59 may be used in this connection.

While it would be very advantageous to balance the rotor perfectly in one reading, this ordinarily cannot be done due to the considerable magnitude of the initial unbalance of an average rotor, thereby necessitating two or three readings. In a typical case, the unbalance indication must be reduced from the order of two millivolts reading of meter 59 down to less than ten microvolts, a ratio of 200 to 1. By adjusting the attenuator potentiometer 53, the signal voltage range of meter 59 is varied and this meter can be used full scale on minimum signal. Since the signal voltage may change in the ratio of 100 to 1 or more, changing of the meter scale by use of potentiometer 53 is mandatory.

In use, apparatus of the present invention provides the extreme sensitivity required in balancing airplane instrument gyroscope rotors without depending upon super-keen perceptions in the operator. The speed of balancing is several times faster than that possible by methods heretofore used, employing highly skilled operators. Rejections due to defective rotor balancing are reduced from nearly 50% to zero because the apparatus of this invention, in largely removing the human element in making the measurements, obtains the same degree of accuracy on all units tested.

Although the apparatus has been shown as used for testing rotors per se, if desired, rotors may be tested while in their own rotor frames. To accomplish this, the frame 16 is replaced by a suitable ring member having plug clamps for holding the rotor frame in place while testing. The armatures 15 in such case are adapted for removable attachment to the rotor frames.

The band pass filter 55 serves to eliminate harmonics that would otherwise cause meter 59 to give an erroneous voltage reading in measuring magnitude and make it impossible to phase against the reference voltage for determining position. The reference signal also has a high harmonic which the filter 55 eliminates. The pick-up and reference voltages are combined or added together by the mixer transformer 52 and then filtered by the filter 55, thereby precluding the possibility of uncompensated phase shifts in filtering. If desired, a stage of amplification may be inserted ahead of the filter 55.

The ring type pick-up used in this invention, i. e., the pick-ups 11 and 11' employing ring shaped armatures loosely coupled to the main part of the pick-up units and without actual physical contact taking place between these parts, is a definite improvement over the phonograph type pick-up disclosed in our copending application. When using the phonograph type pick-up, damping is considerable because the angular position of the displacement vector is never independent of speed in the operating range. Thus, at 200 R. P. S. a change of 20 R. P. S. results in a position change of the displacement vector of 2½ degrees. An even more serious difficulty of the electromagnetic pick-up is its relatively high critical speed, sometimes known as its resonant speed and is the speed where the vibratory displacement becomes very large and the angle between the displacement vector and the disturbing force, i. e., unbalanced weight, changes very rapidly with changes in speed. This is caused partly by the phenomenon of two resonances in series, one of which is the spring mounted frame and the other the natural frequency of the magnetic pick-up that is mechanically connected to the frame by the needle.

By using the pick-up units of this invention, the critical speed is greatly lowered, for example, from 115 cycles or revolutions per signal to 40 cycles, thereby allowing satisfactory rotor operation at much lower speeds than possible with the phonograph type pick-up unit, and hence correspondingly enlarging the field of use of the apparatus.

The amplifier of known type 57, being a linear amplifier, gives a voltage proportional to the velocity of the pick-up armature 15 since the output voltage of the pick-ups is proportional to velocity. However, should it be desired to provide a voltage output from the amplifier proportional to the amplitude of displacement of the armature 15 instead of the velocity thereof, then, in such case, an integrating amplifier would be substituted for the amplifier 57. This integrating amplifier would serve to integrate or add up the voltage output of the pick-up in such a way as to supply meter 59 with a voltage dependent upon the amplitude of displacement of the armature 15, which, in turn, is a function of the rotor unbalance.

Also, in some instances it is desired to know the forces acting upon the rotor bearings due to rotor unbalance, and since these forces are proportional to acceleration of the unbalanced mass of the rotor, by employing a differentiating type of amplifier instead of amplifier 57, then the velocity signal voltage received by this amplifier from the pick-up is converted into an acceleration or second derivative with respect to time voltage of the pick-up armature 15 displacement.

The filter 55 serves to eliminate all frequencies except the desired rotor frequency corresponding to that rotor speed at which it is desired to balance. It is obvious that the photocell reference voltage, when a maximum as indicated by meter 59, can be used as an indication of correct rotor speed for purposes of test.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for balancing rotors, means for pivoting the rotor and its frame in one plane, means for measuring the vibration of said rotor in another plane without actually contacting said rotor or its frame, said measuring means being adjustable for producing a voltage variable as to phase, means for producing a reference voltage dependent on the speed of the rotor, and indicator means for comparing the phase positions of said voltages to determine the location of unbalance.

2. In an apparatus for balancing rotors, means for pivoting the rotor and its frame in one plane, means for producing an alternating E. M. F. serving as a measure of the magnitude of the unbalance of said rotor in another plane without actually contacting said rotor or its frame, said measuring means being adjustable for varying the phase thereof, and means for producing a reference alternating E. M. F. responsive to the speed of said rotor for comparison in phase with that of said measuring means, whereby the location of such unbalance may be determined.

3. In an apparatus for balancing rotors, means for receiving and pivotally supporting a rotor about an end thereof, means for supplying a reference voltage dependent on the speed of said rotor, an electromagnetic pick-up having a portion thereof carried by said supporting means and another separate portion thereof adjustable for phasing the output thereof against said reference voltage, and an indicator responsive to said voltages.

4. In an apparatus for balancing rotors, means for receiving and for selectively pivotally supporting a rotor at either of two points on the spin axis thereof, said rotor being otherwise free to deflect transversely in any direction, means for rotating the rotor, means for supplying an alternating E. M. F. of a frequency corresponding to the speed of the rotor, electromagnetic pick-up means actuated by transverse deflection of said rotor to produce alternating E. M. F.'s selectively responsive to the displacement of the said rotor axis about either of said two pivot points due to unbalance, and indicating means arranged to be controlled in response to said E. M. F.'s.

5. In an apparatus for balancing rotors, means for supporting a rotor and its frame, means for supplying an alternating E. M. F. of a frequency corresponding to the speed of the rotor; said supply means comprising a photocell activated by a beam of light reflected from the rotor having a portion of its surface of reflecting nature and another portion of non-reflecting nature, electromagnetic means for coupling to said rotor frame to produce an alternating E. M. F. responsive to the unbalance of the rotor, said electromagnetic means comprising an armature carried by said frame and voltage generating means disconnected from said armature, and indicating means arranged to be controlled in response to said E. M. F.'s, said voltage generating means being turnable to vary the phase of the E. M. F. output thereof, whereby its output may be used to oppose the output of said photocell.

6. In an apparatus for balancing rotors, means for rotatably supporting a rotor, an electromagnetic pick-up for coupling to said means adjacent an end of the rotor to produce an alternating E. M. F. responsive to rotor unbalance, said pick-up having a portion thereof turnable about the axis of the rotor to vary the phase of the output of said pick-up, means for supplying an alternating E. M. F. synchronous with the speed of the rotor, an indicator, and a mixer for receiving and combining said E. M. F.'s for use in controlling said indicator.

7. In an apparatus for balancing rotors, means for rotatably supporting a rotor, an electromagnetic pick-up for coupling to said means adjacent an end of the rotor to produce an alternating E. M. F. responsive to rotor unbalance, said pick-up having a portion thereof carried by said supporting means and another portion thereof turnable about the axis of the rotor to vary the phase of the output of said pick-up, means for supplying an alternating E. M. F. synchronous with the speed of the rotor, means for combining said E. M. F.'s, a filter for receiving said combined E. M. F.'s and acting to eliminate harmonics, and an indicator operable in response to the output of said filter.

8. In an apparatus for balancing rotors, a rotor frame adapted to receive a rotor, spring means for pivotally supporting said frame selectively about either of two correction planes extending perpendicular to the rotor axis, said rotor and supporting means being otherwise free to deflect transversely of the normal position of said axis in any direction, electromagnetic pick-up units associated with the ends of said rotor frame, an indicating circuit including an indicator, means for supplying a reference voltage to said indicating circuit, and switch means for selectively connecting said pick-up units to said indicating circuit depending on the correction plane in which said frame is pivoted.

9. A rotor balancing apparatus as defined in claim 8, wherein said pick-up units are turnable to vary the phase of the output thereof for opposing said reference voltage, and angle indicators connected to said pick-ups for showing the angular position of the same when the output thereof directly opposes said reference voltage, such angular position indication serving to determine the location of unbalance in the rotor.

10. In an apparatus for balancing rotors, a frame adapted to receive a rotor and arranged to be pivotally supported at a point on the spin axis of and adjacent an end of said rotor, an electromagnetic pick-up loosely coupled to the other end of said frame concentric with said rotating axis for measuring the vibration thereat, means for supplying a reference voltage, an indicator circuit arranged for connection to said pick-up and said reference voltage means, said circuit including an indicator for indicating and comparing the outputs of said pick-up and reference voltage means.

11. In an apparatus for balancing rotors, a frame adapted to receive a rotor and arranged to be pivotally supported at a point on the spin axis of and adjacent an end of said rotor, an electromagnetic pick-up loosely coupled to the other end of said frame for measuring the vibration thereat, means for supplying a reference voltage, an indicator circuit having an input transformer provided with primary windings arranged for connection respectively to said pick-up and said reference voltage supply means, a potentiometer connected to the output of said transformer, filtering and amplifying means supplied from said potentiometer, and an indicator operated from the output of said last named means.

12. In an apparatus for balancing rotors, means for rotatably supporting the rotor, means for pivotally restraining said rotor at a point along the spin axis thereof, said axis being free to generate a cone having said point as an apex under the influence of unbalance, an electromagnetic pick-up having an armature carried by said supporting means and displaced therewith and cooperable magnetic pole means independently supported out of contact with said armature, said pick-up serving to produce an alternating E. M. F. dependent on the velocity of vibration of said supporting means, means for producing a reference alternating E. M. F. dependent on the speed of said rotor, and indicating means for receiving said E. M. F.'s and furnishing an indication of unbalance.

13. In an apparatus for balancing rotors of the type having parallel end faces, a rotor bearing frame adapted to rotatably support the rotor under test, means for pivoting said frame at a point on the spin axis of said rotor in the plane of one face of the rotor, said means being so constructed and arranged as to permit vibration of the rotor about said point as a pivot in any direction transverse to said spin axis, and means for measuring any such vibration of the other face of said rotor without actually contacting said frame.

14. In an apparatus for balancing rotors of the type having parallel end faces, a rotor bearing frame adapted to rotatably support the rotor under test for spinning about a vertical axis, means for alternatively pivoting said frame at a point on said spin axis in the plane of either the upper or lower face of the rotor, said means being so constructed and arranged as to permit vibration about said point as a pivot in any direction transverse to said spin axis, and means for measuring such vibration at the other face of said rotor without actually contacting said frame.

15. In an apparatus for balancing rotors of the type having parallel end faces, bearing members for temporarily rotatably mounting a rotor to be tested, a common frame supporting said members, a plurality of pairs of leaf springs symmetrically placed around said frame and slidably secured to said frame, each spring being thus secured at one point adjacent its inner end, the two springs of each pair being placed substantially in the same planes as the two faces of the rotor, respectively, means for sliding all of the springs in one plane outwardly to clamp said frame in the plane of one rotor face and means responsive to vibrations of the frame at the other rotor face for indicating the out of balance of the rotor at said face.

16. In an apparatus for balancing rotors of the type having parallel end faces, bearing members for temporarily rotatably mounting a rotor to be tested with its spin axis vertical, a common frame supporting said members, a plurality of pairs of leaf springs symmetrically placed around said frame and slidably secured to said frame, each spring being thus secured at one point adjacent its inner end, the two springs of each pair being placed substantially in the same horizontal planes as the top and bottom faces of the rotor, respectively, means for sliding all of the springs in one plane outwardly to clamp said frame in the plane of one rotor face and means responsive to vibrations of the frame at the other rotor face for indicating the out of balance of the rotor at said face.

17. An apparatus for balancing rotors as claimed in claim 15, in which said means for sliding all of said springs in one plane outwardly, comprises a cam for each spring and a linkage system connecting the cams for all springs in one plane to move said springs equally and simultaneously.

18. In apparatus for balancing rotors, a frame adapted to receive a rotor and pivotally supported at a point on the rotor axis adjacent an end of the rotor, said frame being otherwise unrestrained transversely of said axis, an electromagnetic pick-up comprising a stationary core, a coil mounted thereon, means for producing magnetic flux in said core and a ring-shaped armature mounted on said frame at an unrestrained point, said armature cooperating with said core without coming into contact therewith to vary the flux in said core responsive to displacement of said frame about said pivot point and thereby generate an E. M. F. in said coil proportional to rotor unbalance, and indicating means receiving said E. M. F.

19. In an apparatus for balancing rotors of the type having parallel end faces, a rotor bearing frame adapted to rotatably support the rotor under test, means for pivoting said frame at a point on the spin axis of said rotor in the plane of one of said faces, said means being so constructed and arranged as to permit motion of said frame under the influence of rotor unbalance in a substantially conical path having said point as an apex, a coil, means for producing magnetic flux linking with said coil, and permeable means mounted on said frame at a point other than said pivot point for varying the flux linked with said coil responsive to displacement of said frame from the position assumed when mounting a balanced rotor.

ORLAND E. ESVAL.
CARL A. FRISCHE.